(12) United States Patent
Hsiao

(10) Patent No.: US 11,100,073 B2
(45) Date of Patent: Aug. 24, 2021

(54) METHOD AND SYSTEM FOR DATA ASSIGNMENT IN A DISTRIBUTED SYSTEM

(71) Applicant: Yahoo Holdings, Inc., Sunnyvale, CA (US)

(72) Inventor: Jen-Hao Hsiao, Taipei (TW)

(73) Assignee: VERIZON MEDIA INC., New York, NY (US)

( * ) Notice: Subject to any disclaimer, the term of this patent is extended or adjusted under 35 U.S.C. 154(b) by 538 days.

(21) Appl. No.: 14/938,990

(22) Filed: Nov. 12, 2015

(65) Prior Publication Data

US 2017/0139913 A1    May 18, 2017

(51) Int. Cl.
G06F 16/22 (2019.01)
H04L 29/08 (2006.01)
G06F 16/27 (2019.01)
G06F 16/182 (2019.01)

(52) U.S. Cl.
CPC ........ *G06F 16/2255* (2019.01); *G06F 16/182* (2019.01); *G06F 16/278* (2019.01); *H04L 67/1097* (2013.01)

(58) Field of Classification Search
CPC .......... G06F 17/3033; G06F 17/30584; G06F 16/2255; G06F 16/182; G06F 16/278; H04L 67/1097
See application file for complete search history.

(56) References Cited

U.S. PATENT DOCUMENTS

| 7,685,109 B1 * | 3/2010 | Ransil | G06F 17/30336 |
| | | | 707/999.003 |
| 2004/0186846 A1 * | 9/2004 | Birdwell | G06F 17/30327 |
| 2004/0215640 A1 * | 10/2004 | Bamford | G06F 16/27 |
| 2007/0100873 A1 * | 5/2007 | Yako | G06F 17/3033 |
| 2008/0270374 A1 * | 10/2008 | Li | G06F 17/30495 |
| 2009/0271412 A1 * | 10/2009 | Lacapra | G06F 17/30206 |
| 2010/0174714 A1 * | 7/2010 | Asmundsson | G06F 17/30327 |
| | | | 707/737 |
| 2012/0109888 A1 * | 5/2012 | Zhang | G06F 17/30584 |
| | | | 707/610 |
| 2013/0254290 A1 * | 9/2013 | Grossman | H04L 67/306 |
| | | | 709/204 |
| 2014/0016872 A1 * | 1/2014 | Chao | G06F 16/51 |
| | | | 382/218 |
| 2014/0214855 A1 * | 7/2014 | Attaluri | G06F 17/3033 |
| | | | 707/747 |
| 2014/0344401 A1 * | 11/2014 | Varney | H04L 67/1097 |
| | | | 709/217 |
| 2016/0087880 A1 * | 3/2016 | Shalita | H04L 67/2842 |
| | | | 709/215 |

* cited by examiner

*Primary Examiner* — Alford W Kindred
*Assistant Examiner* — Lin Lin M Htay
(74) *Attorney, Agent, or Firm* — Venable LLP

(57) ABSTRACT

The present teaching relates to methods, systems, and programming for data assignment in a distributed system. In one example, a plurality of tables is obtained. Each of the plurality of tables includes a plurality of buckets. Each of the plurality of tables is generated based on a same set of keys and a different function. The buckets in the plurality of tables are projected into different partitions. Data in the plurality of tables are assigned to a plurality of nodes in the distributed system such that data in buckets that are projected into a same partition are assigned to a same node in the distributed system.

19 Claims, 14 Drawing Sheets

METHOD AND SYSTEM FOR DATA ASSIGNMENT IN A DISTRIBUTED SYSTEM

BACKGROUND

1. Technical Field

The present teaching relates to methods, systems, and programming for data processing. Particularly, the present teaching is directed to methods, systems, and programming for data assignment in a distributed system.

2. Discussion of Technical Background

Locality sensitive hashing (LSH) is a basic primitive in large-scale data processing algorithms that are designed to operate on objects (with features) in high dimensions, e.g. to accelerate search speed at a data retrieval system. Using this technique, large-scale data processing problems are made more tractable. For instance, in conjunction with standard indexing techniques, it becomes possible to do nearest-neighbor search efficiently: given a query, hash the query into a bucket, use the objects in the bucket as candidates, and ranking the candidates according to the similarity of each candidate to the query.

Space complexity of a conventional LSH is very large, because it needs a large number of hash tables to guarantee its search quality. Hence, implementing LSH in the distributed environment that comprises multiple server nodes will be a possible solution for applying such a hash technique to a very large-scale dataset. But there is no existing distributed LSH methods that do not suffer from a long query response time that makes the communication delay become the system's bottleneck.

Therefore, there is a need to develop techniques for implementing LSH in a distributed environment to overcome the above drawbacks.

SUMMARY

The present teaching relates to methods, systems, and programming for data processing. Particularly, the present teaching is directed to methods, systems, and programming for data assignment in a distributed system.

In one example, a method, implemented on a machine having at least one processor, storage, and a communication platform capable of connecting to a network for data assignment in a distributed system is disclosed. A plurality of tables is obtained. Each of the plurality of tables includes a plurality of buckets. Each of the plurality of tables is generated based on a same set of keys and a different function. The buckets in the plurality of tables are projected into different partitions. Data in the plurality of tables are assigned to a plurality of nodes in the distributed system such that data in buckets that are projected into a same partition are assigned to a same node in the distributed system.

In a different example, a system having at least one processor, storage, and a communication platform capable of connecting to a network for data assignment in a distributed system is disclosed. The system includes a hash table generator configured for obtaining a plurality of tables each of which includes a plurality of buckets, wherein each of the plurality of tables is generated based on a same set of keys and a different function; a distributed hash bucket computer configured for projecting the buckets in the plurality of tables into different partitions; and a hash bucket assigner configured for assigning data in the plurality of tables to a plurality of nodes in the distributed system such that data in buckets that are projected into a same partition are assigned to a same node in the distributed system.

Other concepts relate to software for implementing the present teaching on data assignment in a distributed system. A software product, in accord with this concept, includes at least one machine-readable non-transitory medium and information carried by the medium. The information carried by the medium may be executable program code data, parameters in association with the executable program code, and/or information related to a user, a request, content, or information related to a social group, etc.

In one example, a machine-readable, non-transitory and tangible medium having information recorded thereon for data assignment in a distributed system is disclosed. The information, when read by the machine, causes the machine to perform the following: obtaining a plurality of tables each of which includes a plurality of buckets, wherein each of the plurality of tables is generated based on a same set of keys and a different function; projecting the buckets in the plurality of tables into different partitions; and assigning data in the plurality of tables to a plurality of nodes in the distributed system such that data in buckets that are projected into a same partition are assigned to a same node in the distributed system.

Additional novel features will be set forth in part in the description which follows, and in part will become apparent to those skilled in the art upon examination of the following and the accompanying drawings or may be learned by production or operation of the examples. The novel features of the present teachings may be realized and attained by practice or use of various aspects of the methodologies, instrumentalities and combinations set forth in the detailed examples discussed below.

BRIEF DESCRIPTION OF THE DRAWINGS

The methods, systems, and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, systems, components, and/or circuitry have been described at a relatively high-level, without detail, in order to avoid unnecessarily obscuring aspects of the present teachings.

The present disclosure describes method, system, and programming aspects of data assignment in a distributed system, realized as a specialized and networked system by utilizing one or more computing devices (e.g., mobile phone, personal computer, etc.) and network communications (wired or wireless). The method and system as disclosed herein aim at providing a distributed hash technique that can reduce remote accesses during data retrieval.

The strong needs for mobile visual search and recognition have been emerging due to its broad applications in mobile devices, and it enables the possibility of many use cases with great business potential. In general, to accelerate search speed in a data retrieval system, LSH is a commonly used algorithm for high dimensional data. The idea behind LSH is to construct a family of functions that hash objects into buckets such that objects are similar will be hashed to the same bucket with high probability. Here, the type of the objects and the notion of similarity between objects determine the particular hash function family.

Figure 4:
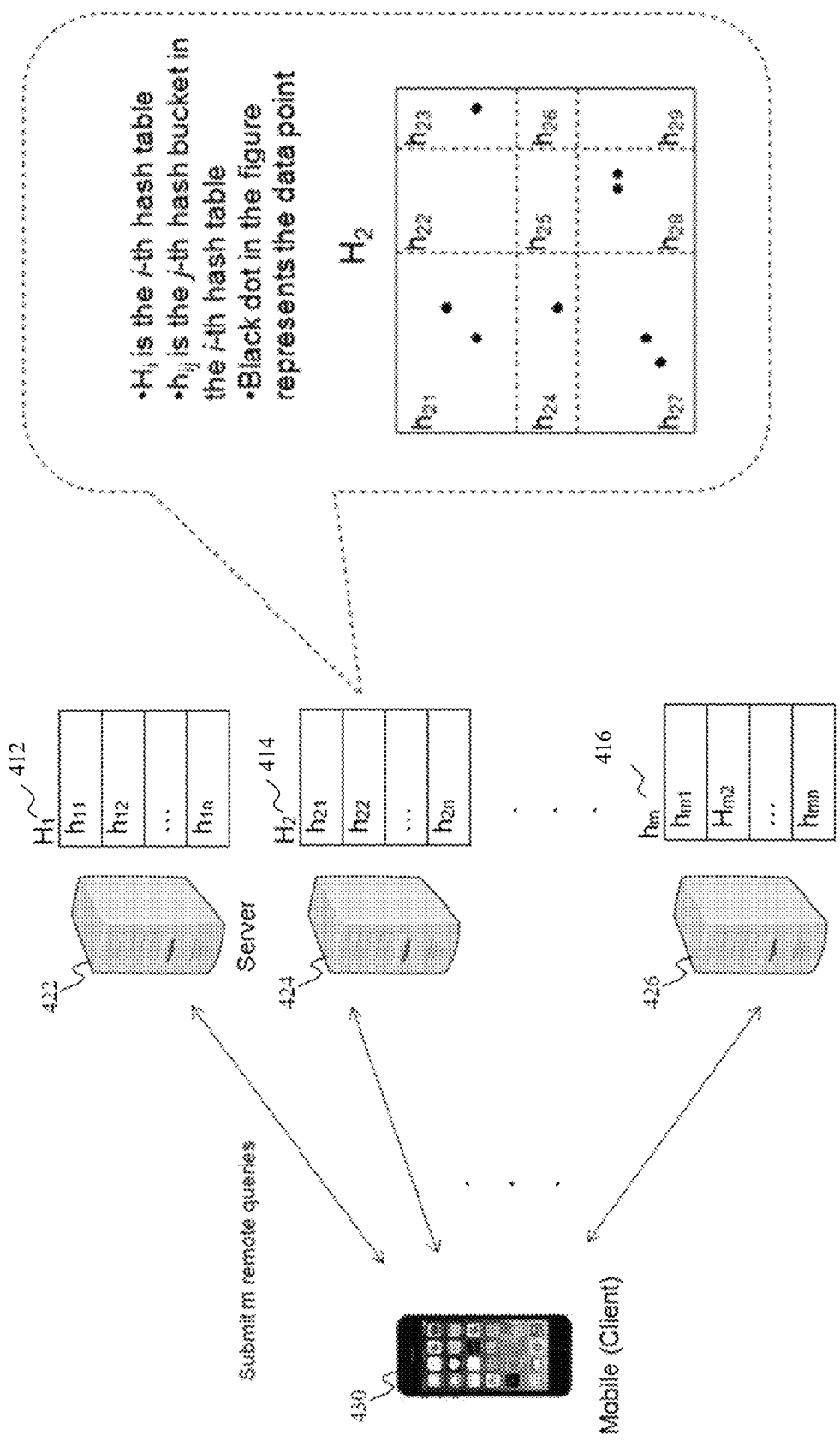
FIG. 4 illustrates an exemplary distributed LSH, according to an embodiment of the present teaching.

To handle its large space complexity, LSH can be implemented in a distributed environment that comprises multiple server nodes. FIG. 4 illustrates an exemplary distributed LSH, according to an embodiment of the present teaching. As shown in FIG. 4, this implementation of LSH in a distributed environment is to have every server node evenly store the hash tables. Assume that m hash tables 412, 414, 416 in LSH are distributed to the v server nodes 422, 424, 426, whereas v is usually by far greater than m under a Hadoop/MapReduce architecture. If m<v, m remote accesses are incurred, i.e. a client 430 needs to submit m remote queries, since different hash tables are stored in different server nodes. If m≥v, it still need v remote accesses to access all the m hash tables, since all the server nodes must be visited. The number of remote accesses thus grows linearly as the number of hash tables in LSH increases. As a result, this method will suffer from a long query response time.

Figure 5:
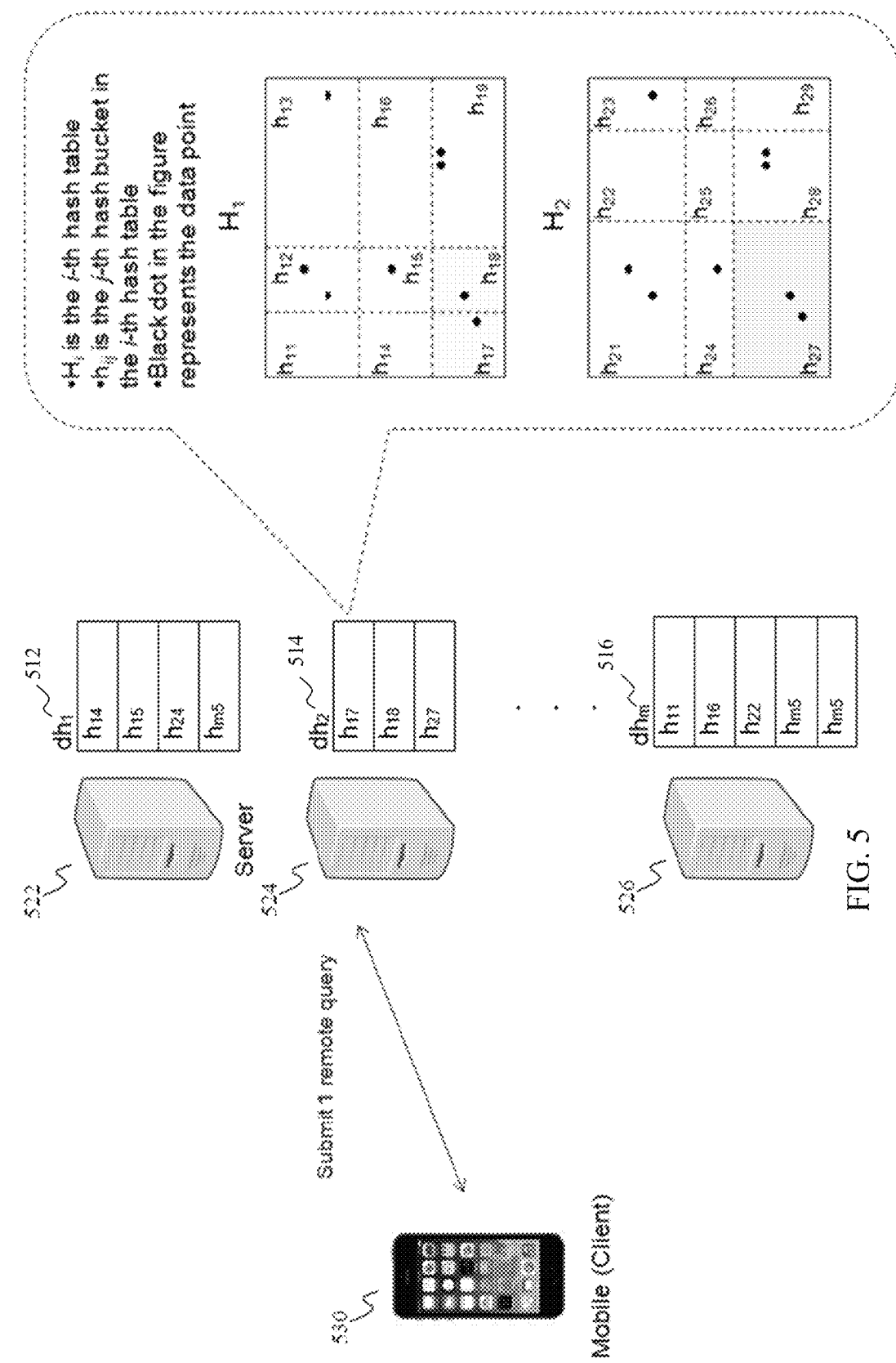
FIG. 5 illustrates another exemplary distributed LSH, according to an embodiment of the present teaching.

A novel distributed hash technique, called Distributed Balance Hash (DBH), is disclosed in the present teaching to reduce remote accesses by assigning hash buckets smartly to the distributed nodes. As shown in FIG. 5, instead of storing a full hash table into a node, the system in the present teaching assigns hash buckets from different hash tables to the same node as much as possible, if the hash buckets are close to each other in the Euclidean space. Based on this strategy, a client 530 can submit a single remote query to access multiple hash buckets that should be accessed in processing the query with merely one single remote access, thereby dramatically decreasing the number of remote accesses and the query response time.

On average, the method disclosed herein can reduce more than 50% of the remote accesses incurred by the method shown in FIG. 4 when m=v. Theoretically, the method in the present teaching can achieve m times saving of remote accesses, when the hash buckets are hashed to the same machine.

In addition to exponentially decrease the network cost, the method disclosed here can maintain a good load balance between different machines. The network efficiency of the disclosed method is independent of the search quality. This offers a very large improvement in both network efficiency and hence overall run time in settings that require similarity search with high accuracy.

Using this DBH data assignment in an image search application, the data (e.g., hash codes) sent from client to server is very compact (e.g., hundreds of bits), and the needed data bandwidth is hundred times smaller than directly sending JPEG images or image features (e.g., usually at least several hundred K-Bytes) from the client side.

Furthermore, this DBH data assignment works on any framework in the general distributed (Key, Value) model, including not only MapReduce, but also popular and active distributed hash table (DHT), p2p networks, etc.

The terms "server", "server node" and "node" maybe used interchangeably herein, to refer to a server node in a distributed system.

Additional novel features will be set forth in part in the description which follows, and in part will become apparent to those skilled in the art upon examination of the following and the accompanying drawings or may be learned by production or operation of the examples. The novel features of the present teachings may be realized and attained by practice or use of various aspects of the methodologies, instrumentalities and combinations set forth in the detailed examples discussed below.

Figure 1:
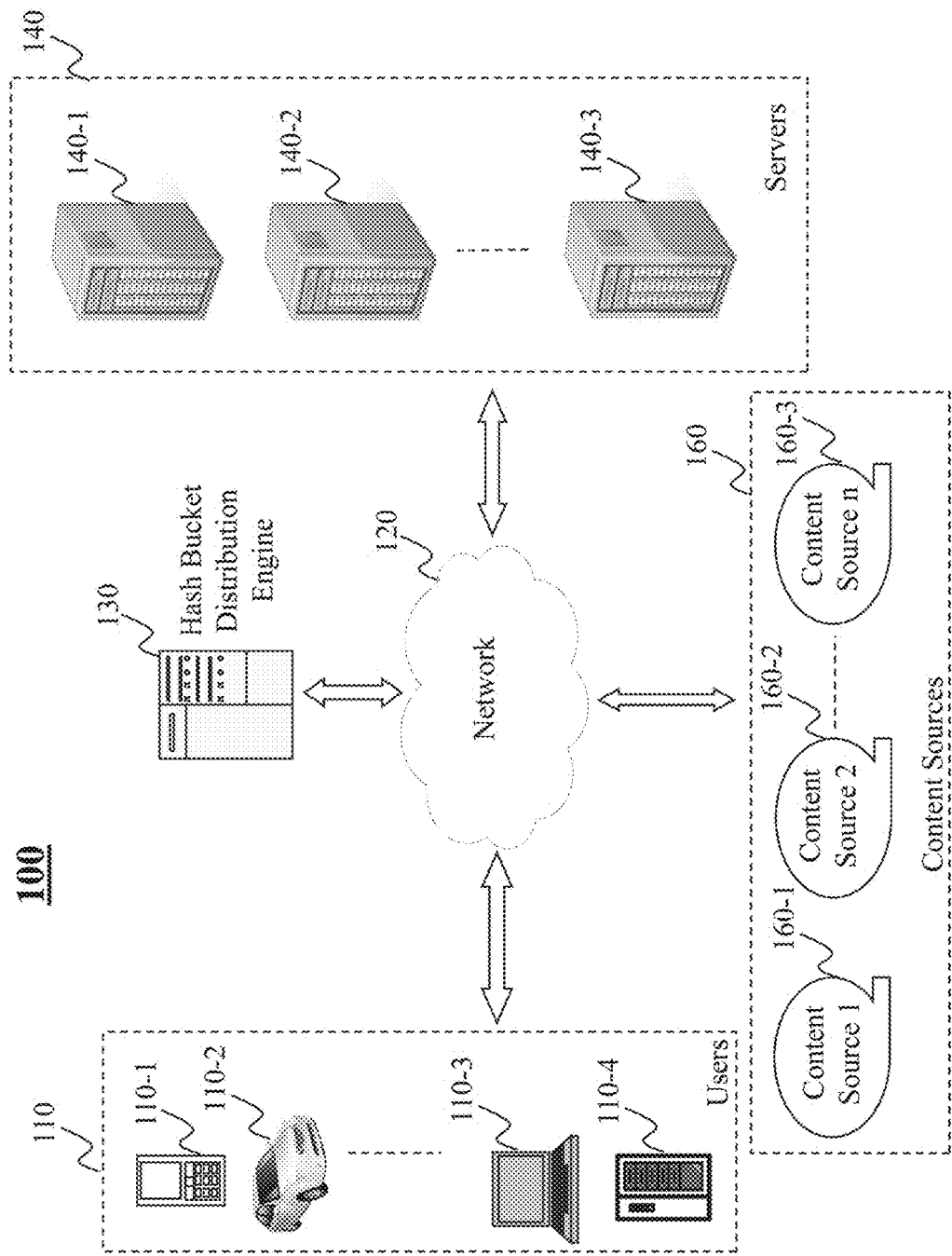
FIG. 1 is a high level depiction of an exemplary networked environment for data assignment in a distributed system, according to an embodiment of the present teaching.

FIG. 1 is a high level depiction of an exemplary networked environment 100 for data assignment in a distributed system, according to an embodiment of the present teaching. In FIG. 1, the exemplary networked environment 100 includes one or more users 110, a network 120, a hash bucket distribution engine 130, a plurality of server nodes 140, and content sources 160. The network 120 may be a single network or a combination of different networks. For example, the network 120 may be a local area network (LAN), a wide area network (WAN), a public network, a private network, a proprietary network, a Public Telephone Switched Network (PSTN), the Internet, a wireless network, a virtual network, or any combination thereof.

Users 110 may be of different types such as users connected to the network 120 via desktop computers 110-4, laptop computers 110-3, a built-in device in a motor vehicle 110-2, or a mobile device 110-1. In one embodiment, users 110 may be connected to the network 120 and able to interact with the hash bucket distribution engine 130 and the plurality of server nodes 140 through wired or wireless technologies and related operating systems implemented within user-wearable devices (e.g., glasses, wrist watch, etc.). A user, e.g., the user 110-1, may send a query to one of the servers 140, via the network 120, to search for a document, an image, a file, etc., and receive a response from one of the servers 140 through the network 120. In one example, because the hash bucket distribution engine 130 has assigned hash buckets that are close to each other in the Euclidean space to a same server, the user may submit a single remote query to access hash buckets stored at a corresponding server.

In one embodiment, one of the servers 140 can perform as a controller to determine which server is a corresponding server for the query, and forwards the query to the corresponding server. In another embodiment, each of the servers 140 in the distributed system including the servers 140 can perform as a controller. As a query is submitted by a user and received randomly by a server, the server can analyze the query to determine which server is a corresponding server for the query, and forwards the query to the corresponding server. In yet another embodiment, the user device can determine a corresponding server for the query before submitting the query, such that the query may be submitted directly to the corresponding server. For example, a user is trying to submit an image query in an image search application. The application at the user device may compute a hash code based on the image query using a hash function, and determine the corresponding server that includes hash buckets covering the hash code. Then, the user device may send the hash code to the corresponding server for performing the image search.

In general, the servers 140 may be servers of a service provider that corresponds to an entity, an individual, a firm, or an organization, such as a television station, a newspaper issuer, a web page host, an online service provider, or a game server. The service provider may be an organization such as USPTO.gov, a content provider such as CNN.com and Yahoo.com, or a content-feed source such as tweeter or blogs. In one embodiment, the service provider includes entities that develop, support and/or provide online content via mobile applications (e.g., installed on smartphones, tablet devices, etc.). The service provider may provide content from the content sources 160 based on a request from a user. A content source may correspond to an entity where the content was originally generated and/or stored. The content sources 160 in the exemplary networked environment 100 include multiple content sources 160-1, 160-2 ... 160-3.

In a large-scale data processing environment, the hash bucket distribution engine 130 may continuously receive data from the content sources 160, generate or update hash tables including hash buckets, and assign the hash buckets into the servers 140. For example, the hash bucket distribution engine 130 may determine a first hash bucket for an input item based on a first hash function, and determine a second hash bucket for the input item based on a second first hash function. Although the two hash buckets are included in two different hash tables, the two hash buckets may be assigned by the hash bucket distribution engine 130 to a same server node because they are close in the Euclidean space. At least, the two hash buckets have overlap in the Euclidean space because they both cover the data point corresponding to the input item. Accordingly, the hash bucket distribution engine 130 may update the server node by adding the data point into the two hash buckets at the server node. It can be understood that a similar procedure can apply to more than two hash tables generated based on more than two hash functions.

In one embodiment, the hash bucket distribution engine 130 may utilize center points of different buckets to assign the buckets into different nodes. The hash bucket distribution engine 130 can determine a center point for each bucket in the hash tables, and put all the center points into an aggregated table. Treating the center points as data points in the aggregated table, the hash bucket distribution engine 130 may construct a second-layer hash function to segment the center points into different partitions. Then, the hash bucket distribution engine 130 can assign buckets, whose center points are segmented into a same partition, and the data in the buckets into a same node in the distributed system.

In practice, the system may want to achieve a balanced data projection, to avoid the situation where points may be much denser in one dimension compared to another. To achieve the balanced data projection, the system can choose the partition dimensions according to the distribution of values in that dimension. For example, the system first extracts directions (i.e., eigenvectors) with maximum variance, e.g. through Principal Component Analysis (PCA) on the data. Since densely distributed dimensions should be chosen with lower probability while dimensions with uniformly distributed values should be chosen with higher probability, the probability of selecting a dimension may be in proportion to its distribution variance (e.g., eigenvalue corresponding to the dimension).

Figure 2:
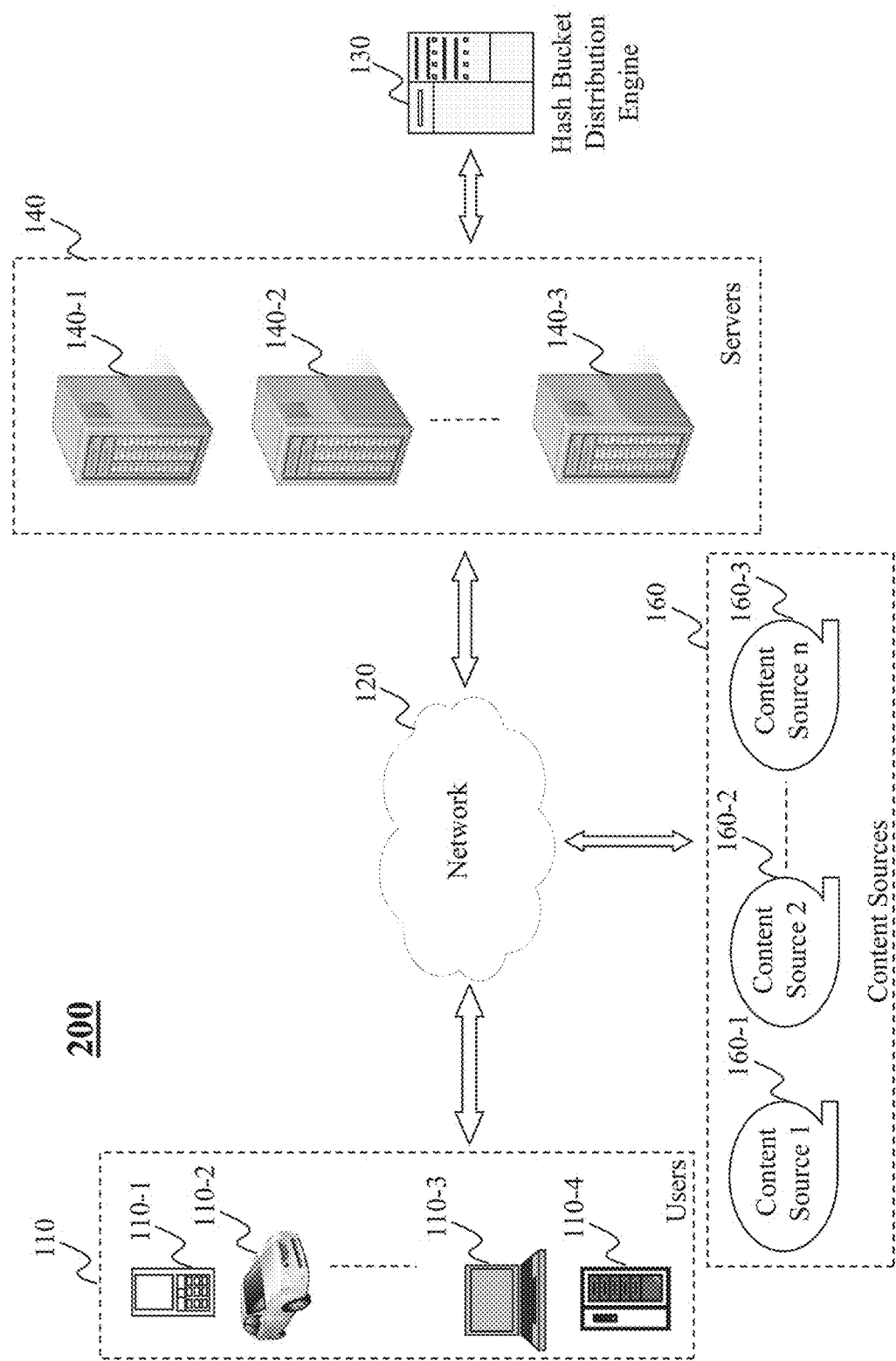
FIG. 2 is a high level depiction of another exemplary networked environment for data assignment in a distributed system, according to an embodiment of the present teaching.

FIG. 2 is a high level depiction of another exemplary networked environment 200 for data assignment in a distributed system, according to an embodiment of the present teaching. The exemplary networked environment 200 in this embodiment is similar to the exemplary networked environment 100 in FIG. 1, except that the hash bucket distribution engine 130 serves as a backend system for the servers 140.

Figure 3:
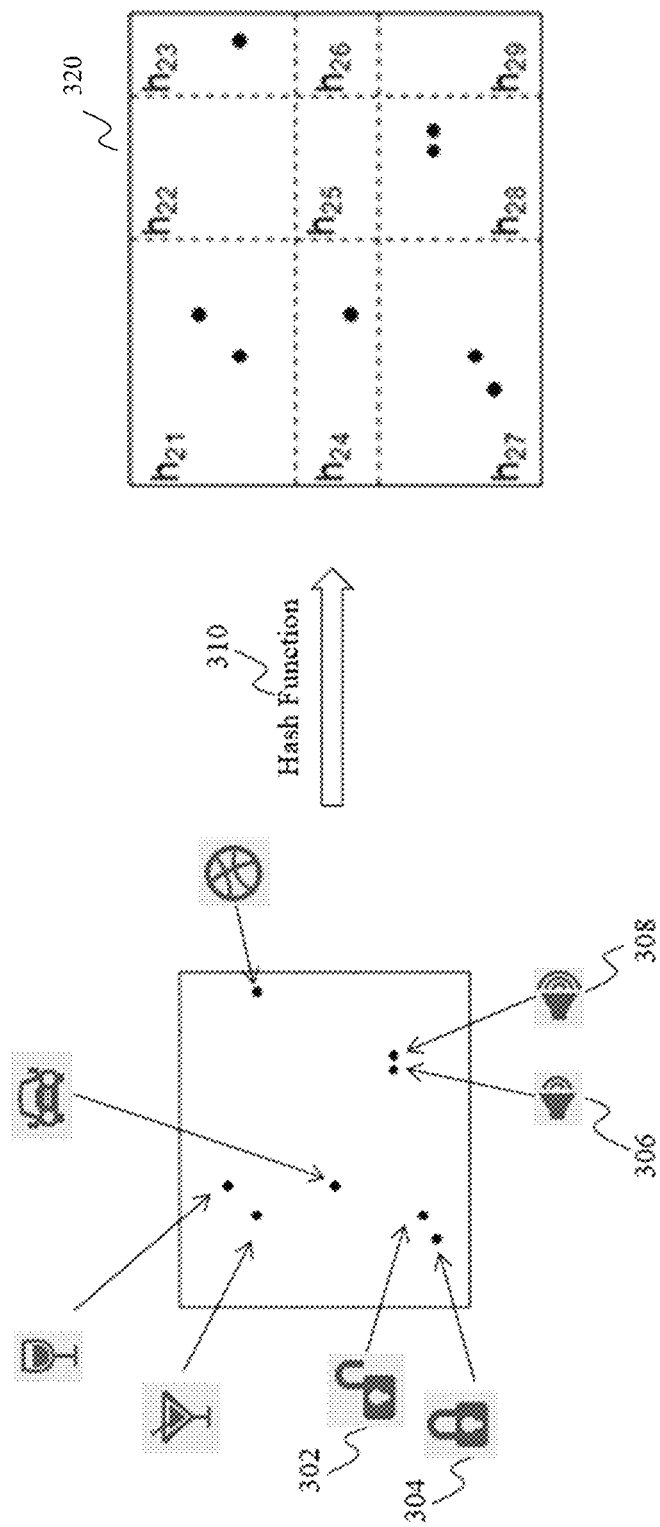
FIG. 3 illustrates generation of an exemplary hash table based on LSH, according to an embodiment of the present teaching.

FIG. 3 illustrates generation of an exemplary hash table based on LSH, according to an embodiment of the present teaching. As shown in FIG. 3, a plurality of image objects are mapped into different data points falling into different hash buckets $h_{21}, h_{22}, \ldots h_{29}$ in a hash table 320, based on a hash function 310. Using the technique of LSH, similar objects will be hashed to the same bucket with high probability. For example, images 302 and 304 are hashed into the same hash buckets $h_{27}$; and images 306 and 308 are hashed into the same hash buckets $h_{28}$. As such, the relative positions of any two data points in the hash table 320 can represent a degree of similarity between the two data points.

Since it is still possible for two close data points to fall into different buckets, LSH needs a large number of hash tables with different bucket partitions to guarantee its search quality. FIG. 4 and FIG. 5 illustrate different exemplary schemes to implement these hash tables in a distributed environment that comprises multiple server nodes. As discussed above, the scheme in FIG. 5 can dramatically decrease the number of remote accesses and the query response time, compared to the scheme in FIG. 4, because the system in accordance with FIG. 5 assigns hash buckets from different hash tables to the same node as much as possible if the hash buckets are close to each other in the Euclidean space.

In one embodiment, assuming that $H_1, H_2, \ldots, H_m$ are the hash tables and each hash table corresponds to hash functions $Hi=\{hf_{i1}, hf_{i2}, \ldots, hf_{in}\}$, where hf are constructed from n randomly chosen hyperplanes. In the K-Nearest Neighbor search for a query q, LSH will need to access the m buckets $H_1(q), H_2(q), H_m(q)$ to acquire needed information, where $H_i(q)$ maps the query q into a bucket $h_{ij}$ in the i-th hash table. In accordance with FIG. 4, hash table $H_i$ with all corresponding buckets $h_{ij}$ are assigned to one server node so that at least m accesses will be needed from client to collect all information.

In contrast, in accordance with FIG. 5, some of the buckets $h_{ij}$ from m different hash tables exist in the same server node, such that each distributed server in FIG. 5 is assigned a group of buckets. For example, the group of buckets $dh_1$ 512 is assigned to the server 522 in FIG. 5, where the group $dh_1$ 512 comprises buckets $h_{14}$, $h_{15}$, $h_{24}$, and $h_{m5}$, because these buckets are close to each other in the Euclidean space. In this case, the system can then reduce remote accesses since a single remote access finishes the access to these buckets.

Figure 6:
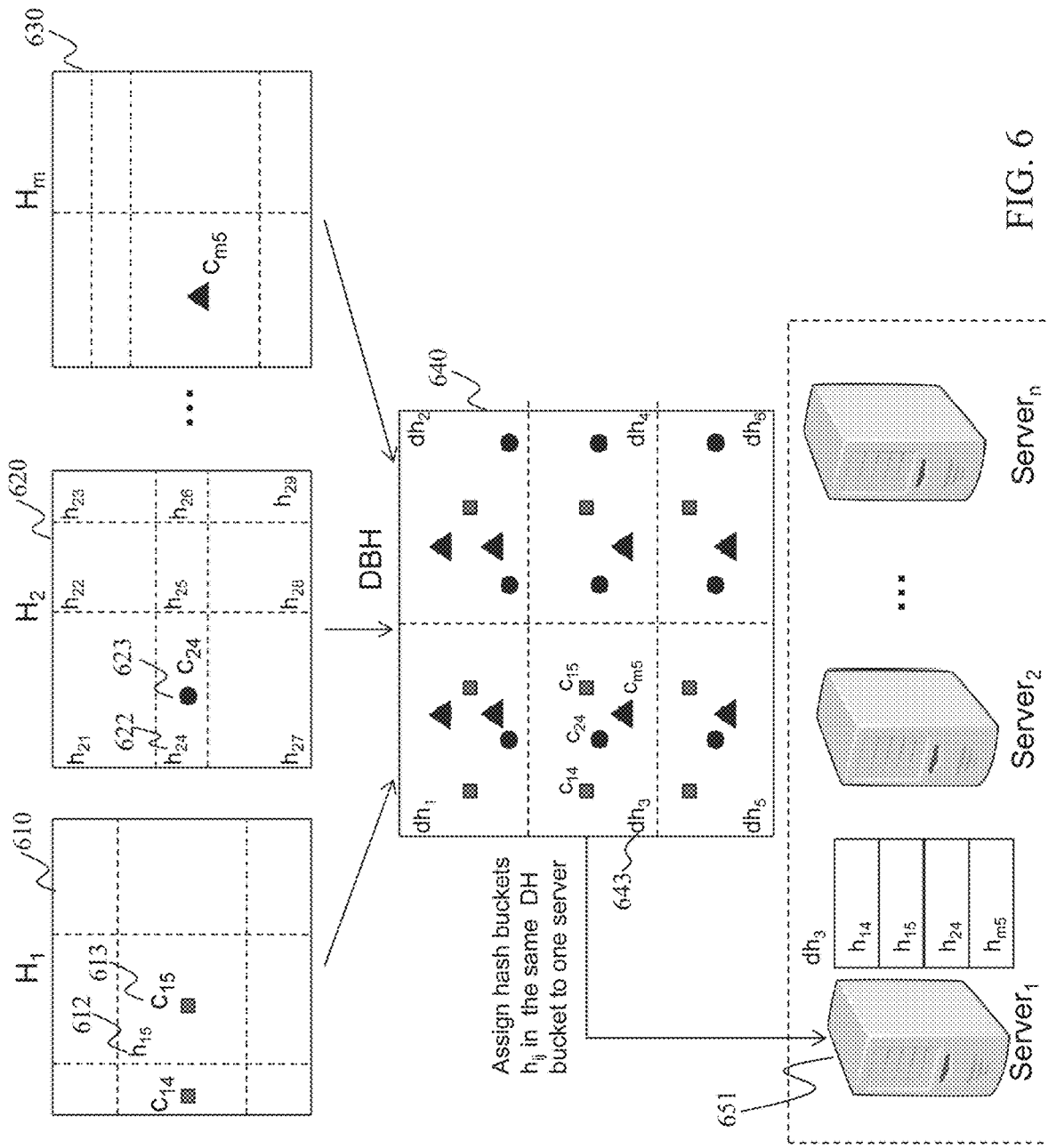
FIG. 6 illustrates an exemplary method for a distributed balanced hash, according to an embodiment of the present teaching.

FIG. 6 illustrates an exemplary method for a distributed balanced hash, according to an embodiment of the present teaching. FIG. 6 shows the core steps to realize the DBH idea. Since hash buckets from different hash tables originate from different hash functions, their hash values may be unrelated to one another. However, hash buckets from different hash tables will overlap in the multi-dimensional Euclidean space if they contain a same data point. Therefore, the center points of the hash buckets are also close in the Euclidean space. As shown in FIG. 6, $c_{15}$ 613 and $c_{24}$ 623 are the center points of hash buckets $h_{15}$ 612 and $h_{24}$ 622 that come from different hash tables $H_1$ 610 and $H_2$ 620 respectively using different hash functions. Despite having different hash values, their corresponding hash buckets overlap in the multi-dimensional Euclidean space and share the same fraction of data points.

Based on this property, the system can construct a second layer hash table 640 by treating each center point of a bucket as its representative and developing a hash function for which closed center points take the same hash value. A second-layer hash function may be constructed for the buckets in original LSH, such that if some buckets belonging to different hash tables contain a same point, the buckets tend to take the same second-layer hash value. FIG. 6 illustrates an example of the space division by the second layer hash, where center points $\{c_{14}, c_{15}, c_{24}, c_{m5}\}$ are hashed into the same second layer hash bucket $dh_3$ 643 and thus have the same second layer hash value.

Then, the system can assign the buckets in different hash tables to the server nodes according to the second-layer hash values for the buckets. All the corresponding data points and LSH hash buckets of these centers in a same second-layer hash bucket may be assigned to a same server node. Thus, in DBH, hash buckets in different hash tables from the original LSH are scattered to multiple server nodes and the server nodes store a mixture of fractions of multiple hash tables. For example, as shown in FIG. 6, original LSH hash buckets $\{h_{14}, h_{15}, h_{24}, h_{m5}\}$ belonging to the same second-layer hash bucket $dh_3$ 643 are all assigned and stored in the same server, $Server_1$ 651, although the hash buckets come from different hash tables $H_1$ 610, $H_2$ 620, and $H_m$ 630.

Figure 7:
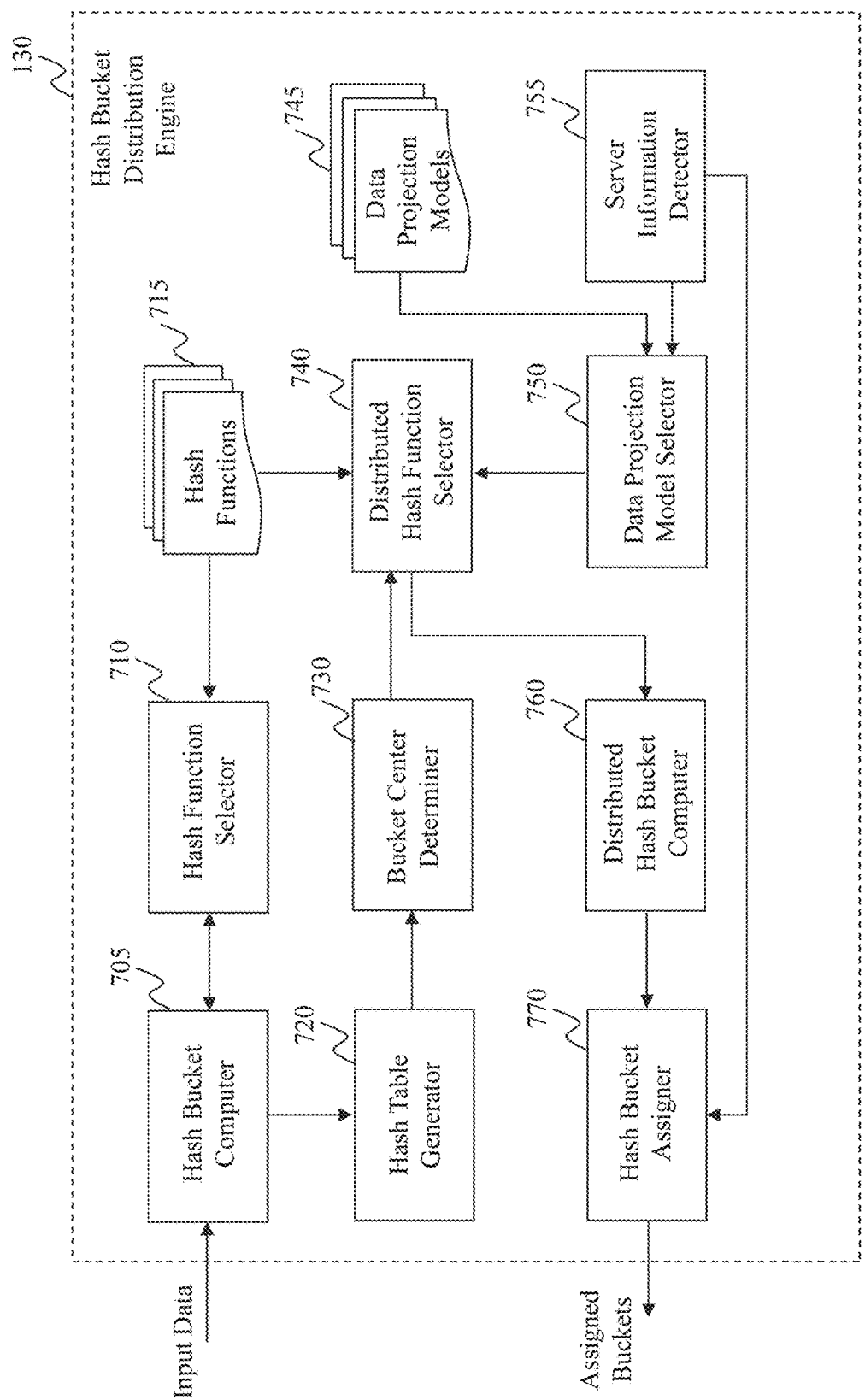
FIG. 7 illustrates an exemplary diagram of a hash bucket distribution engine, according to an embodiment of the present teaching.

FIG. 7 illustrates an exemplary diagram of a hash bucket distribution engine 130, according to an embodiment of the present teaching. The hash bucket distribution engine 130 in this example includes a hash bucket computer 705, a hash function selector 710, one or more hash functions 715, a hash table generator 720, a bucket center determiner 730, a distributed hash function selector 740, one or more data projection models 745, a data projection model selector 750, a server information detector 755, a distributed hash bucket computer 760, and a hash bucket assigner 770.

The hash bucket computer 705 in this example receives input data, e.g. from the content sources 160. In one example, when the distributed system is providing an image search service, the input data may include input items each corresponds to an image file. In another example, when the distributed system is providing a patent search service, the input data may include input items each corresponds to a document of an issued patent or a patent application publication. In general, an input item may be any document or any file in any format.

For each input item received at the hash bucket computer 705, the hash bucket computer 705 may compute a hash bucket based on a hash function selected by the hash function selector 710. The hash bucket computer 705 may inform the hash function selector 710 to select a given number of hash functions. The hash function selector 710 may then select one or more of the hash functions 715 stored at the hash bucket distribution engine 130. In general, a hash function may be any function that can be used to map data of arbitrary size to data of fixed size. A hash function selected by the hash function selector 710 may map an input item, which is called a key, to a hash code or hash value. For LSH, each hash code corresponds to a bucket, and a hash function may be used to hash input items so that similar items map to the same bucket with high probability.

In one embodiment, the hash function selector 710 may receive input items, e.g. forwarded by the hash bucket computer 705. Based on the input items, the hash function selector 710 can select hash functions to make sure similar items map to the same bucket with high probability.

Based on a selected hash function (or a set of selected hash functions), the hash bucket computer 705 may compute a hash bucket for each item, to generate a plurality of buckets that can form a hash table. The hash table generator 720 in this example can receive the plurality of buckets and generate a hash table based on them. For example, the hash table 320 in FIG. 3 includes nine hash buckets. A purpose of LSH is to classify the items or their corresponding data points into different buckets, such that a retrieval system may quickly identify items related to a query by locating a bucket based on a hash value generated from the query, because each bucket includes items that are similar to each other. Since it is still possible for two close data points to fall into different buckets, LSH needs a large number of hash tables with different bucket partitions to guarantee its search quality. Each of hash tables is generated by the hash table generator 720 based on a different hash function (or a different set of hash functions) and the same set of input items, such that each hash table includes same data points partitioned into buckets in different manners, e.g. like hash tables $H_1$ 610, $H_2$ 620, and $H_m$ 630 shown in FIG. 6. The hash table generator 720 in this example sends the generated hash tables to the bucket center determiner 730.

The bucket center determiner 730 in this example can determine a center point for each bucket in each of the hash tables sent by the hash table generator 720. Each center point can represent a position of the corresponding bucket in Euclidean space. The center points can be utilized to classify the buckets of different tables into different groups, such that each group includes buckets that are close to each other in Euclidean space. It can be understood that methods other than using center points may be applied to divide the buckets based on their respective positions in Euclidean space. In this example, the bucket center determiner 730 may send the information of the center points to the distributed hash function selector 740.

The distributed hash function selector 740 in this example can treat each center point of a bucket as its representative and select one or more hash functions, which may be called distributed hash functions or second-layer hash functions, to map the center points to buckets which may be called distributed hash (DH) buckets or second-layer hash buckets.

A purpose may be to map close center points to a same second-layer hash bucket with high probability.

The distributed hash function selector 740 may select the second-layer hash functions based on an analysis of the center points, and based on a data projection model selected by the data projection model selector 750. The data projection model selector 750 in this example selects one of the data projection models 745 stored at the hash bucket distribution engine 130. A data projection model may indicate how to project different data points to different nodes. For example, a data projection model may indicate to project data points randomly to the nodes. Another data projection model may indicate to project data points evenly to the nodes.

The server information detector 755 in this example can detect information of the distributed servers. The information can indicate the workload at each server. The server information detector 755 can send the detected information to the data projection model selector 750 for selecting a proper data projection model. For example, if the server information detector 755 detects that the workloads of all servers in the distributed system are currently balanced, the data projection model selector 750 may select a balanced data projection model to project data points evenly to the servers. For example, if the server information detector 755 detects that one server has a workload that is much lower than other servers, the data projection model selector 750 may select a data projection model to first project enough data points into the server to make its workload close to the workloads of other servers, and then project the left data points evenly to the servers.

The data projection model selector 750 may send the selected data projection model to the distributed hash function selector 740. The selected data projection model may be utilized by the distributed hash function selector 740 to select second-layer hash functions. For example, based on a balanced data projection model for projecting data points evenly, the distributed hash function selector 740 may select second-layer hash functions to segment data points evenly into different buckets, such that different buckets include data points of more or less a same amount.

The distributed hash bucket computer 760 in this example computes DH buckets or second-layer hash buckets based on the center points using second-layer hash functions selected by the distributed hash function selector 740. The second-layer hash buckets thus can form an aggregated hash table or second-layer hash table. For example, the second-layer hash table 640 in FIG. 6 is formed by six second-layer hash buckets. The distributed hash bucket computer 760 may send information about the second-layer hash buckets to the hash bucket assigner 770 for data assignment in the distributed system.

The hash bucket assigner 770 in this example receives server information detected by the server information detector 755 and second-layer bucket information from the distributed hash bucket computer 760. The hash bucket assigner 770 may assign the second-layer buckets to different nodes in the distributed system. Because each second-layer bucket includes center points of original buckets or first-layer buckets that are close in Euclidean space, the hash bucket assigner 770 therefore assigns first-layer buckets that are close in Euclidean space to a same node as much as possible. The assignment includes assigning, to a same node, data points and metadata related to a group of first-layer buckets that are close in Euclidean space. The hash bucket assigner 770 may send, to each node in the distributed system, information (data points and metadata) related to buckets assigned to the node.

Figure 8:
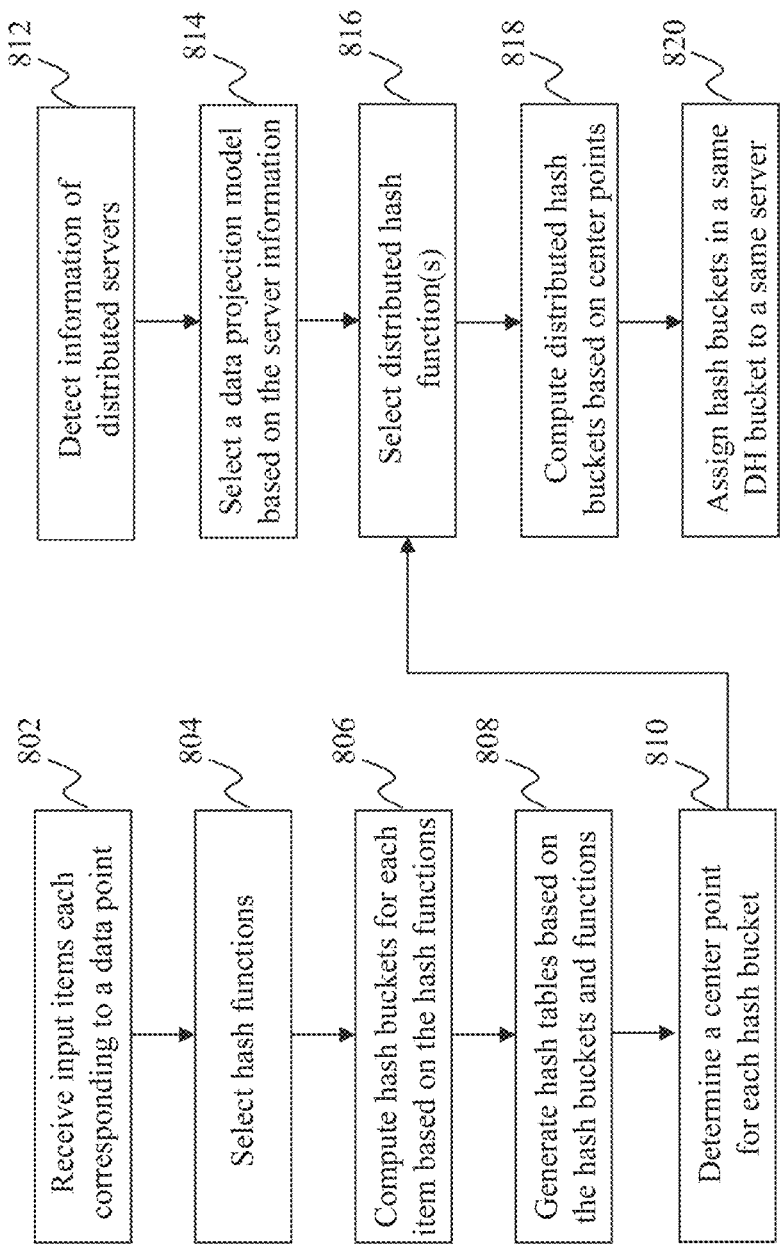
FIG. 8 is a flowchart of an exemplary process performed by a hash bucket distribution engine, according to an embodiment of the present teaching.

FIG. 8 is a flowchart of an exemplary process performed by a hash bucket distribution engine, e.g. the hash bucket distribution engine 130 in FIG. 7, according to an embodiment of the present teaching. At 802, input items are received. Each input item corresponds to a data point. One or more hash functions are selected at 804. Hash buckets are computed at 806 for each item based on the hash functions, such that items may be mapped into buckets in different manners according to different hash functions. At 808, hash tables are generated or formed based on the hash buckets and functions. At 810, a center point is determined for each hash bucket. The process then moves on to step 816.

At 812, information of distributed servers may be detected. A data projection model is selected at 814 based on the detected server information. The process then moves on to step 816.

At 816, one or more distributed hash functions are selected based on the data projection model. Distributed hash (DH) buckets are computed at 818 based on center points, using the one or more distributed hash functions. At 820, hash buckets in a same DH bucket are assigned to a same server for data assignment in the distributed system.

It can be understood that the order of the steps shown in FIG. 8 may be changed according to different embodiments of the present teaching.

Figure 9:
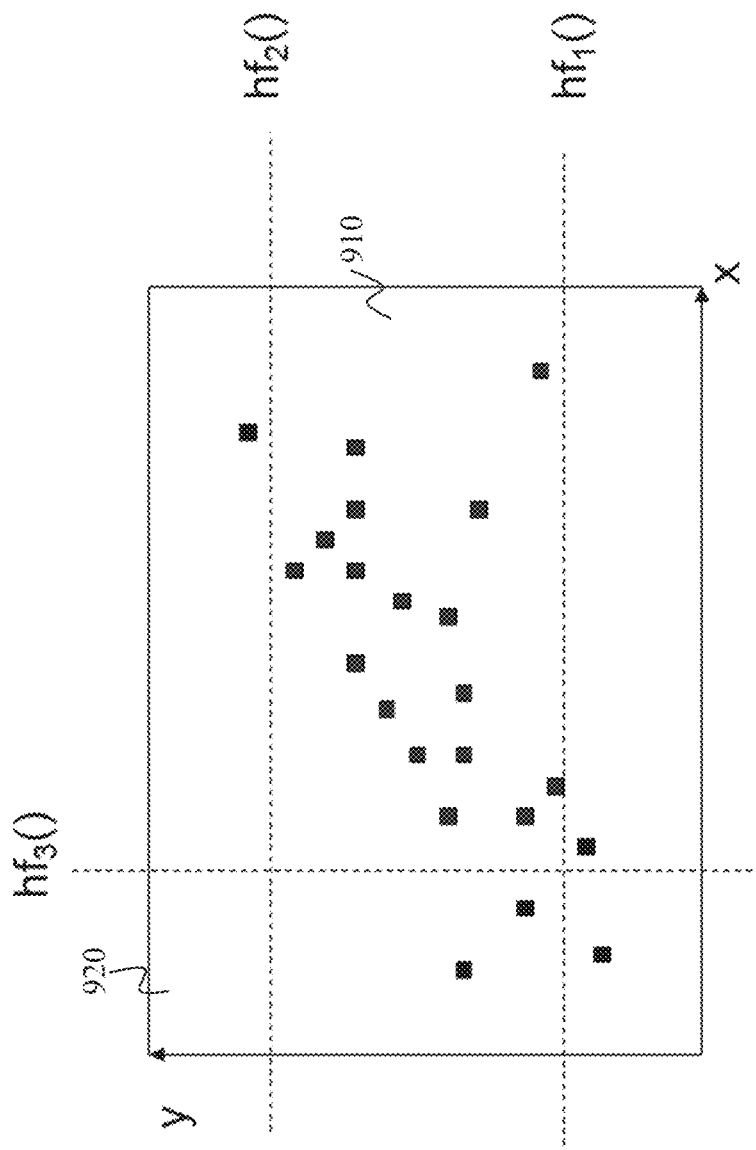
FIG. 9 illustrates a random data projection, according to an embodiment of the present teaching.

As discussed above, to construct the second-layer hash, the system may adopt different data projection models. FIG. 9 illustrates a random data projection, according to an embodiment of the present teaching, where the system uses a random projection to generate the second-layer hash buckets. In this case, the random vector may be data-independent. This is not very efficient in practice because it requires multiple tables to achieve the sample locality preserving goal. In addition, the center points may be distributed denser in some second-layer buckets than others, while some second-layer buckets are very sparse or even empty. As shown in FIG. 9, the second-layer bucket 910 includes much more points than other second-layer buckets; while the second-layer bucket 920 does not include any point at all. This may cause unbalanced workloads on the distributed nodes, if the system assigns the data to the nodes according to the segmentation of the six second-layer buckets in FIG. 9.

Figure 10:
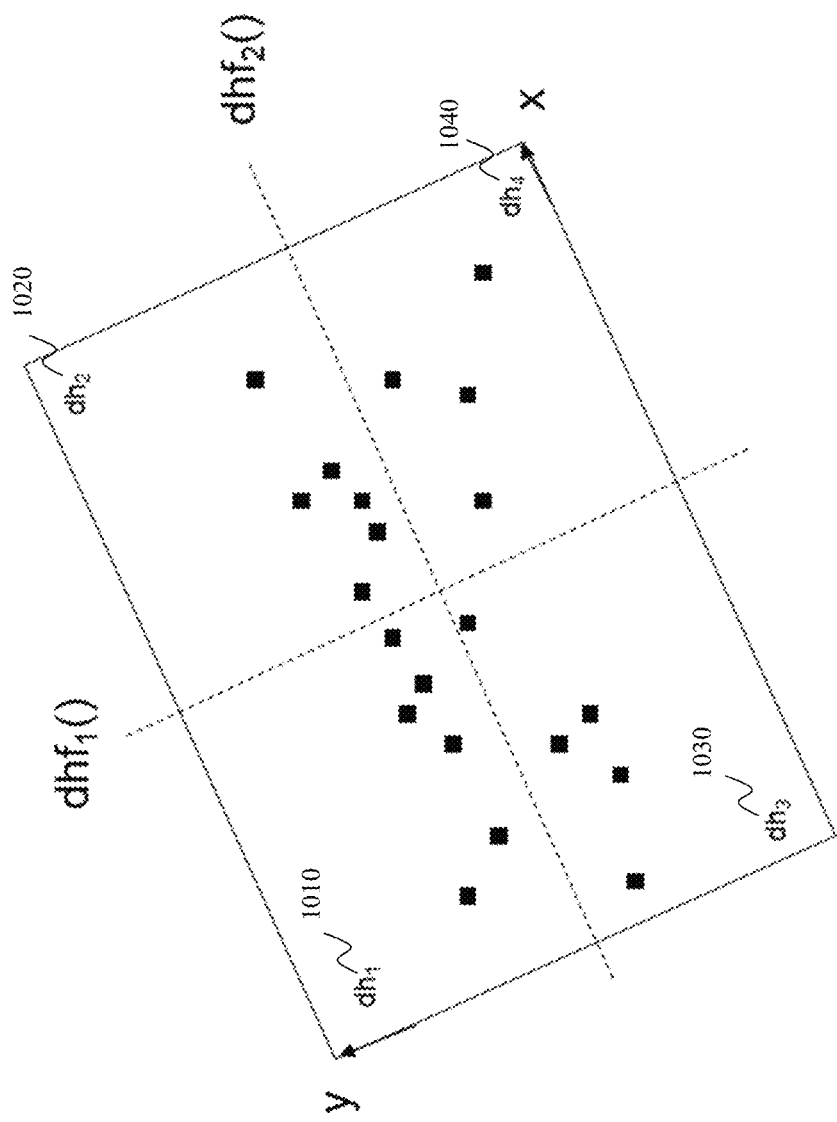
FIG. 10 illustrates a balanced data projection, according to an embodiment of the present teaching.

FIG. 10 illustrates a balanced data projection, according to an embodiment of the present teaching. With a balanced hash, the system may use several strategies to enhance the hash performance. In one example, for any center point $c_{ij}$, the system can calculate one hash bit based on the following equation:

$$h(x) = \text{sign}(w^T * c_{ij} - t)$$

where w is a projection vector in the feature space, and t is a threshold scalar. In general, vector $\underline{x}$ represents a center point of a first-layer bucket in a multi-dimensional Euclidean space. Then the system can calculate one hash bit for the center point based on the following equation:

$$h(x) = \text{sign}(w^T * \underline{x} - t)$$

where w is a projection vector in the feature space, and t is a threshold scalar.

In a real dataset, points may be denser in one dimension compared to another, as shown in FIG. 9. To solve the problem, the system may choose the partition dimensions according to the distribution of values in that dimension. To achieve this, the system can first extract directions $w_i$ (i.e., eigenvectors) with maximum variance through Principal Component Analysis (PCA) on the data. Since densely distributed dimensions should be chosen with lower probability while dimensions with uniformly distributed values should be chosen with higher probability as shown in FIG. 10, the system can set the probability of selecting dimension i in proportion to its distribution variance, e.g., in proportion to the eigenvalue $I_i$. This can optimize the hash performance for each component of the hash function. In practice, the number of bits may be about 20-40, depending on the size of data.

The system may choose a balanced threshold t for balancing hash bit and thus improving the search performance. In one example, the system can choose t as the median value at the first time of choosing a specific direction $w_i$ such that half of the bits are +1, and the other half are −1. This can be repeated for each direction. For example, the data points in the two-dimensional hash table in FIG. 10 are divided into four second-layer buckets $dh_1$ 1010, $dh_2$ 1020, $dh_3$ 1030, $dh_4$ 1040, along two dimensions based on the maximum variance analysis described above. As shown in FIG. 10, the distributed balance hash can make each bucket include about the same number of data points. This can cause balanced workloads on the distributed nodes, if the system assigns the data to the nodes according to the segmentation of the four second-layer buckets in FIG. 10.

Figure 11:
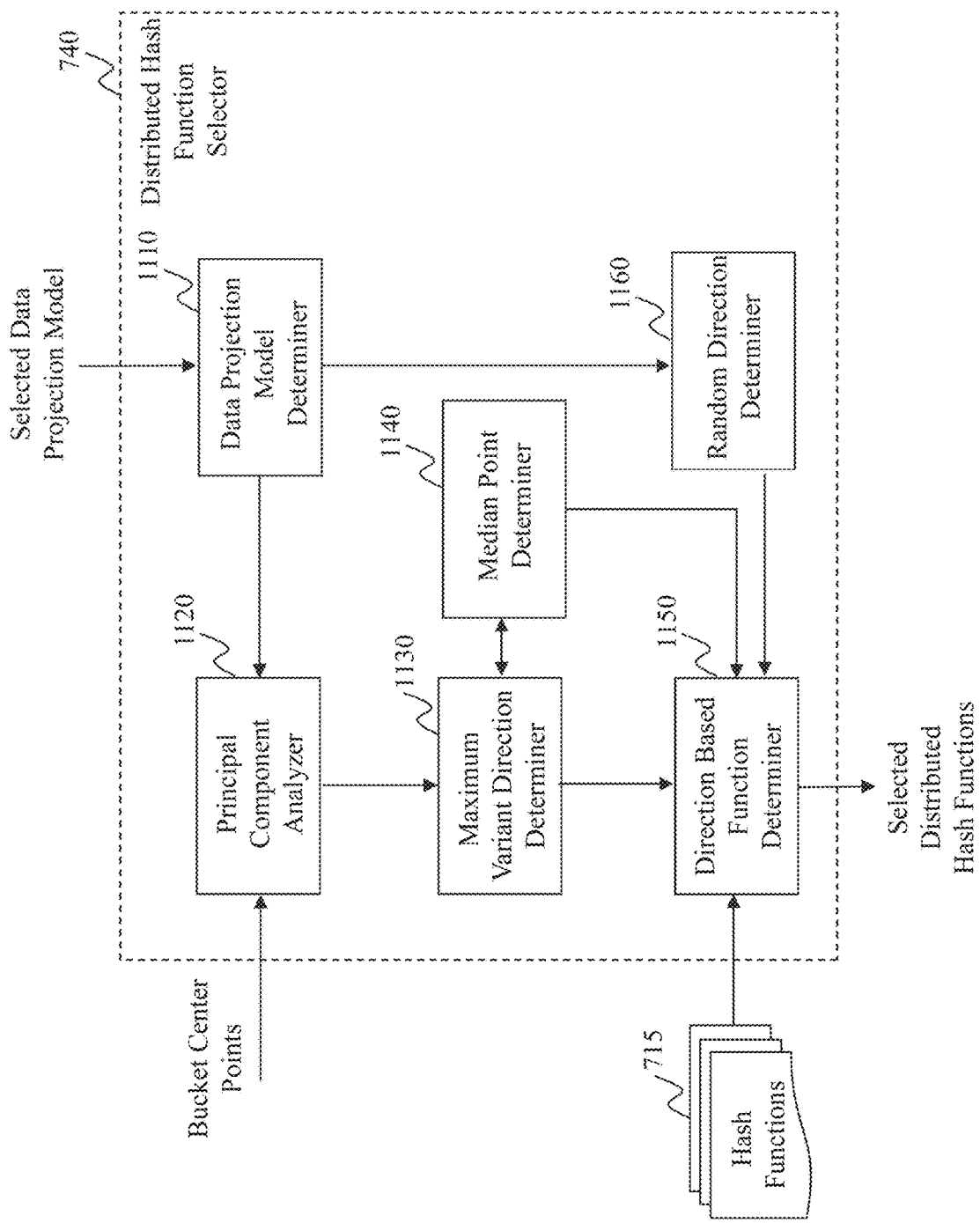
FIG. 11 illustrates an exemplary diagram of a distributed hash function selector, according to an embodiment of the present teaching.

FIG. 11 illustrates an exemplary diagram of a distributed hash function selector 740, according to an embodiment of the present teaching. The distributed hash function selector 740 in this example includes a data projection model determiner 1110, a principal component analyzer 1120, a maximum variant direction determiner 1130, a median point determiner 1140, a direction based function determiner 1150, and a random direction determiner 1160.

The data projection model determiner 1110 in this example receives a selected data projection model from the data projection model selector 750 and determines whether the data projection model indicates a random data projection or a balanced data projection. When the data projection model indicates a random data projection, the data projection model determiner 1110 may inform the random direction determiner 1160 to determine directions randomly for second-layer bucket segmentation. The random direction determiner 1160 in this example can randomly determine one or more directions for hash function generation. The random direction determiner 1160 may send the one or more random directions to the direction based function determiner 1150 for generating second-layer hash functions.

When the data projection model indicates a balanced data projection, the data projection model determiner 1110 may inform the principal component analyzer 1120 to perform a principal component analysis. The principal component analyzer 1120 in this example receives bucket center points from the bucket center determiner 730 and performs a principal component analysis on the center points upon receiving a signal from the data projection model determiner 1110. Based on the principal component analysis, the maximum variant direction determiner 1130 can determine directions of the center point distribution with maximum variances. The median point determiner 1140 can determine a median value or median point of the center point distribution along each of the directions.

In one example, for a d-dimensional hash table, the maximum variant direction determiner 1130 may first determine a direction (e.g. an eigenvector) along which the center points have a maximum variance. The median point determiner 1140 may then determine a medium point along the direction, such that a second-layer hash function may be generated to classify the center points into two partitions, by cutting cross the medium point and orthogonal to the direction. The maximum variant direction determiner 1130 may then determine a second direction (e.g. an eigenvector) along which the center points have a maximum variance among the left d−1 dimensions. The median point determiner 1140 may then determine a second medium point along the second direction, such that an additional second-layer hash function may be generated to classify the center points further into four partitions, by cutting cross the second medium point and orthogonal to the second direction. This process may repeat until d directions are determined and the center points are divided into $2^d$ partitions.

The direction based function determiner 1150 in this example may determine the second-layer hash functions from the hash functions 715 stored at the hash bucket distribution engine 130. For a balanced data projection model, the direction based function determiner 1150 may determine second-layer hash functions based on the directions determined by the maximum variant direction determiner 1130 and corresponding median points determined by the median point determiner 1140. For example, the direction based function determiner 1150 may determine or select second-layer hash functions $dhf_1( )$ and $dhf_2( )$ for the center points in FIG. 10. For a random data projection model, the direction based function determiner 1150 may determine second-layer hash functions based on the directions determined by the random direction determiner 1160. For example, the direction based function determiner 1150 may select second-layer hash functions $hf_1( )$, $hf_2( )$, and $hf_3( )$ for the center points in FIG. 9. The direction based function determiner 1150 may send the selected distributed hash functions or second-layer hash functions to the distributed hash bucket computer 760 for computing second-layer hash buckets.

Figure 12:
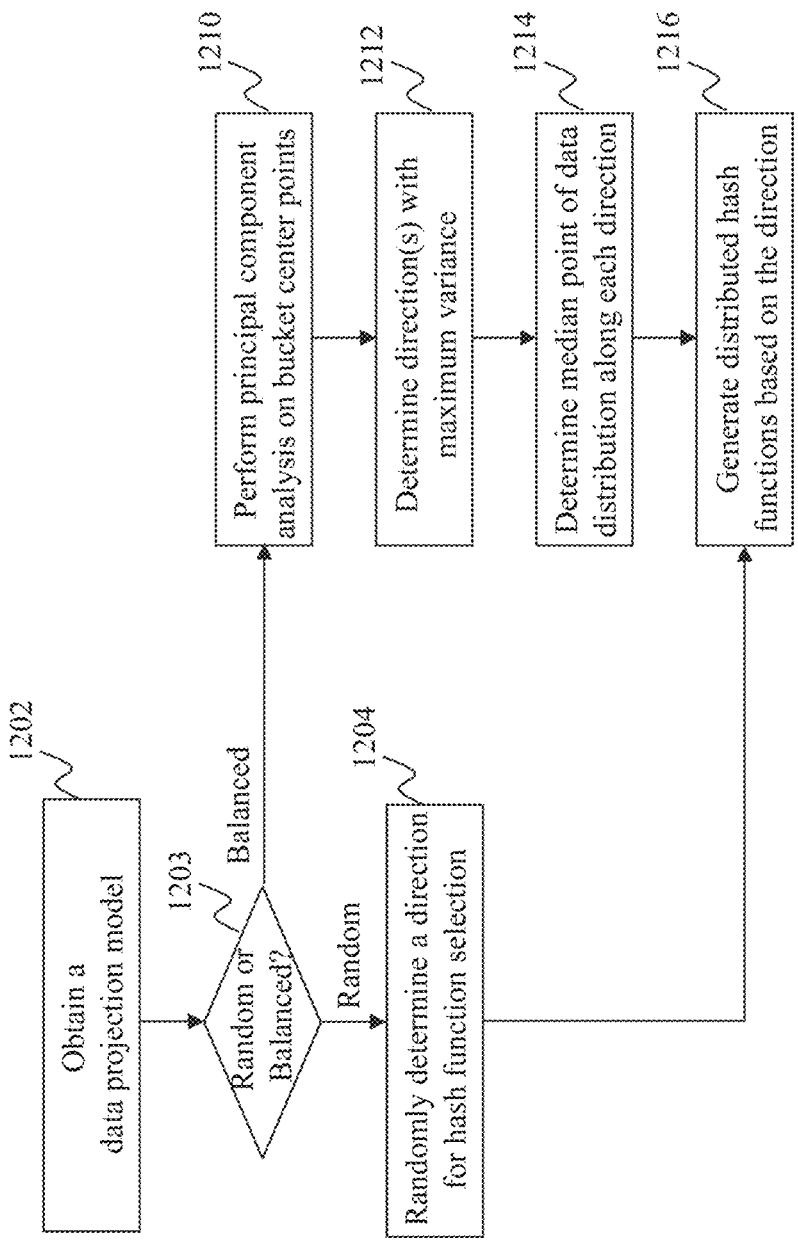
FIG. 12 is a flowchart of an exemplary process performed by a distributed hash function selector, according to an embodiment of the present teaching.

FIG. 12 is a flowchart of an exemplary process performed by a distributed hash function selector, e.g. the distributed hash function selector 740 in FIG. 11, according to an embodiment of the present teaching. A data projection model is obtained at 1202. It is determined at 1203 that whether this is a random data projection model or a balanced data projection model.

If this is a random data projection model, the process goes to 1204, where one or more directions determined randomly for hash function selection. The process then moves on to 1216.

If this is a balanced data projection model, the process goes to 1210, where a principal component analysis is performed on the bucket center points. At 1212, one or more directions are determined based on maximum variances in the center point distribution. At 1214, median points of data distribution are determined along each of the determined directions. The process then moves on to 1216, where distributed hash functions are generated based on the one or more directions that are determined based on a random data projection model or a balanced data projection model.

It can be understood that the order of the steps shown in FIG. 12 may be changed according to different embodiments of the present teaching.

In one embodiment, the balanced data projection may also be applied at the first-layer hash table. Referring back to FIG. 7, the 710 in this embodiment may receive the input items and the data projection model selected by the 750. If the data projection model indicates a balanced data projection, the 710 may also perform PCA, maximum variant direction determination, median point determiner, etc. like the 740, to determine or select first-layer hash functions for segmenting data points evenly into different buckets at the first layer.

Figure 13:
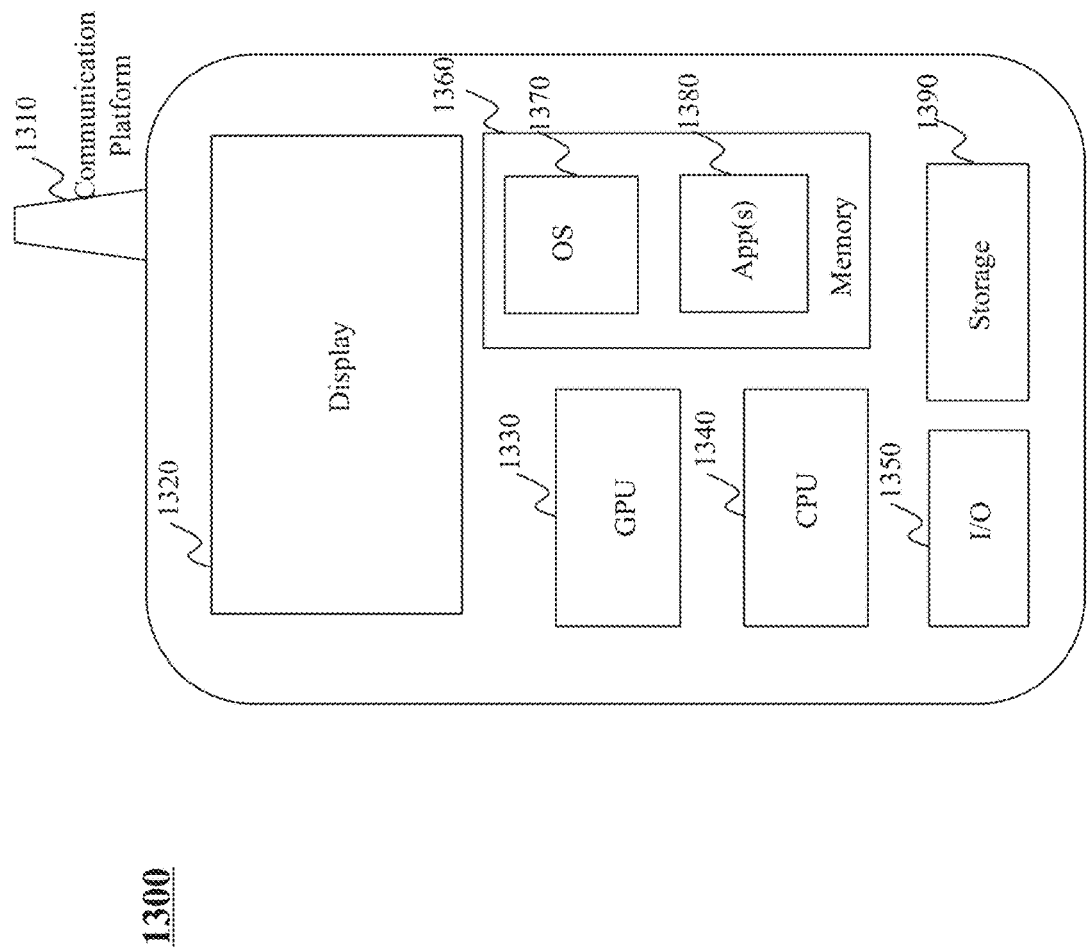
FIG. 13 depicts the architecture of a mobile device which can be used to implement a specialized system incorporating the present teaching.

FIG. 13 depicts the architecture of a mobile device which can be used to realize a specialized system implementing the present teaching. In this example, the user device on which a search result is presented and interacted-with is a mobile device 1300, including, but is not limited to, a smart phone, a tablet, a music player, a handled gaming console, a global positioning system (GPS) receiver, and a wearable computing device (e.g., eyeglasses, wrist watch, etc.), or in any other form factor. The mobile device 1300 in this example includes one or more central processing units (CPUs) 1340, one or more graphic processing units (GPUs) 1330, a display 1320, a memory 1360, a communication platform 1310, such as a wireless communication module, storage 1390, and one or more input/output (I/O) devices 1350. Any other suitable component, including but not limited to a system bus or a controller (not shown), may also be included in the mobile device 1300. As shown in FIG. 13, a mobile operating system 1370, e.g., iOS, Android, Windows Phone, etc., and one or more applications 1380 may be loaded into the memory 1360 from the storage 1390 in order to be executed by the CPU 1340. The applications 1380 may include a browser or any other suitable mobile apps for receiving search result information on the mobile device 1300. User interactions with the search result information may be achieved via the I/O devices 1350 and provided to the distributed system 140 and/or other components of systems 100 and 200, e.g., via the network 120.

To implement various modules, units, and their functionalities described in the present disclosure, computer hardware platforms may be used as the hardware platform(s) for one or more of the elements described herein (e.g., the distributed system 140, the hash bucket distribution engine 130 and/or other components of systems 100 and 200 described with respect to FIGS. 1-12). The hardware elements, operating systems and programming languages of such computers are conventional in nature, and it is presumed that those skilled in the art are adequately familiar therewith to adapt those technologies about data assignment in a distributed system as described herein. A computer with user interface elements may be used to implement a personal computer (PC) or other type of work station or terminal device, although a computer may also act as a server if appropriately programmed. It is believed that those skilled in the art are familiar with the structure, programming and general operation of such computer equipment and as a result the drawings should be self-explanatory.

Figure 14:
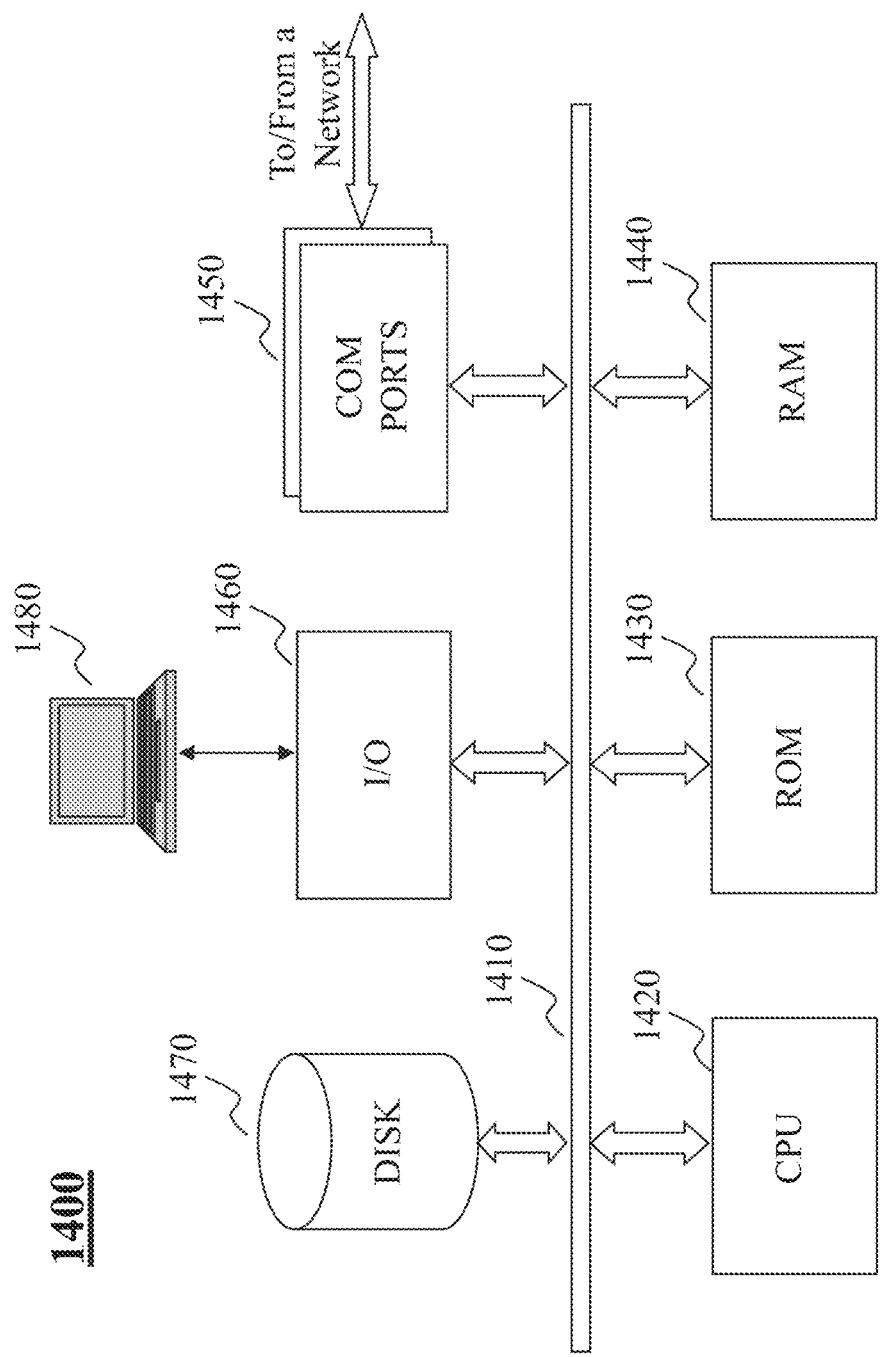
FIG. 14 depicts the architecture of a computer which can be used to implement a specialized system incorporating the present teaching.

FIG. 14 depicts the architecture of a computing device which can be used to realize a specialized system implementing the present teaching. Such a specialized system incorporating the present teaching has a functional block diagram illustration of a hardware platform which includes user interface elements. The computer may be a general purpose computer or a special purpose computer. Both can be used to implement a specialized system for the present teaching. This computer 1400 may be used to implement any component of the techniques of data assignment in a distributed system, as described herein. For example, the hash bucket distribution engine 130, etc., may be implemented on a computer such as computer 1400, via its hardware, software program, firmware, or a combination thereof. Although only one such computer is shown, for convenience, the computer functions relating to data assignment in a distributed system as described herein may be implemented in a distributed fashion on a number of similar platforms, to distribute the processing load.

The computer 1400, for example, includes COM ports 1450 connected to and from a network connected thereto to facilitate data communications. The computer 1400 also includes a central processing unit (CPU) 1420, in the form of one or more processors, for executing program instructions. The exemplary computer platform includes an internal communication bus 1410, program storage and data storage of different forms, e.g., disk 1470, read only memory (ROM) 1430, or random access memory (RAM) 1440, for various data files to be processed and/or communicated by the computer, as well as possibly program instructions to be executed by the CPU. The computer 1400 also includes an I/O component 1460, supporting input/output flows between the computer and other components therein such as user interface elements 1480. The computer 1400 may also receive programming and data via network communications.

Hence, aspects of the methods of data assignment in a distributed system, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, from a management server or host computer into the hardware platform(s) of a computing environment or other system implementing a computing environment or similar functionalities in connection with data assignment in a distributed system. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those skilled in the art will recognize that the present teachings are amenable to a variety of modifications and/or enhancements. For example, although the implementation of various components described above may be embodied in a hardware device, it may also be implemented as a software only solution—e.g., an installation on an existing server. In addition, the data assignment in a distributed system as disclosed herein may be implemented as a firmware, firmware/software combination, firmware/hardware combination, or a hardware/firmware/software combination.

While the foregoing has described what are considered to constitute the present teachings and/or other examples, it is understood that various modifications may be made thereto and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

I claim:

1. A method, implemented on a machine having at least one processor, storage, and a communication platform connected to a network for data assignment in a distributed system, the method comprising:
    obtaining a plurality of first-layer hash tables, each of which includes a plurality of first buckets, wherein each of the plurality of first-layer hash tables is generated based on a same set of keys and a different first-layer hash function;
    determining a center point in a feature space for each first bucket included in each of the plurality of first-layer hash tables to obtain a plurality of center points;
    generating an aggregated table that includes each center point of each first bucket included in the plurality of first-layer hash tables;
    determining one or more directions in the feature space with maximum variance of each center point;
    determining a median point in the feature space of a center point distribution along each of the one or more directions in the feature space;
    mapping each center point to one of a plurality of second buckets of the aggregated table based on a second-layer hash function, the one or more directions, and the respective median points in the feature space, wherein center points corresponding to different first buckets that overlap in the feature space are mapped to a same second bucket in the aggregated table, wherein mapping each center point comprises segmenting the plurality of center points to the one of the plurality of second buckets of the aggregated table based on the second-layer hash function; and
    assigning at least one of the plurality of second buckets to a node in the distributed system such that data items stored within one or more of the plurality of first buckets whose center points are mapped to the same second bucket are assigned to a same node in the distributed system so that the data items assigned to the same node represent similar data items.

2. The method of claim 1, wherein segmenting the plurality of center points to the one of the plurality of second buckets of the aggregated table based on the second-layer hash function comprises:
    segmenting the plurality of center points to the one of the plurality of second buckets based on a respective position of each center point in the feature space, wherein the feature space is Euclidean space.

3. The method of claim 1, wherein segmenting further comprising:
    determining one or more hash functions based on the one or more directions and their respective median points in the feature space, wherein each center point in the aggregated table is segmented into different partitions based on the one or more hash functions.

4. The method of claim 1, wherein the at least one of the plurality of second buckets is randomly assigned to the same node in the distributed system.

5. The method of claim 1, wherein each of the plurality of first-layer hash tables is a hash table generated based on a corresponding hash function.

6. The method of claim 5, further comprising:
    receiving input items each corresponding to one of the same set of keys; and
    computing, based on the corresponding hash function corresponding to each first-layer hash table of the plurality of first-layer hash tables, the same set of keys into the plurality of first buckets included in a corresponding first-layer hash table.

7. The method of claim 1, wherein assigning further comprises:
    assigning one second bucket of the plurality of second buckets in the aggregated table to a first node in the distributed system, wherein assigning the one second bucket comprises:
    determining at least one first bucket from at least one first-layer hash table having a corresponding center point mapped to the one second bucket, and
    sending data items from each of the at least one first bucket to the first node in the distributed system; and
    assigning a different second bucket of the plurality of second buckets in the aggregated table to a second node in the distributed system, wherein assigning the different second bucket comprises:
    determining at least one different first bucket from at least one first-layer hash table having a corresponding center point mapped to the different second bucket, and
    sending data items from each of the different second bucket to the second node in the distributed system.

8. A system having at least one processor, storage, and a communication platform connected to a network for data assignment in a distributed system, comprising:
    a hash table generator configured for obtaining a plurality of first-layer hash tables, each of which includes a plurality of first buckets, wherein each of the plurality of first-layer hash tables is generated based on a same set of keys and a different first-layer hash function;
    a bucket center determiner configured for:
        determining a center point in a feature space for each first bucket included in each of the plurality of first-layer hash tables to obtain a plurality of center points, generating an aggregated table that includes each center point of each first bucket included in the plurality of first-layer hash tables, and mapping each center point to one of a plurality of second buckets of the aggregated table;

a maximum variant direction determiner configured for determining one or more directions in the feature space with maximum variance of each center point;

a median point determiner configured for determining a median point in the feature space of a center point distribution along each of the one or more directions in the feature space, wherein:

the center point is mapped to the one of the plurality of second buckets of the aggregated table based on a second-layer hash function, the one or more directions, and the respective median points in the feature space, wherein center points corresponding to different first buckets that overlap in the feature space are mapped to a same second bucket in the aggregated table, wherein mapping each center point comprises segmenting the plurality of center points to the one of the plurality of second buckets of the aggregated table based on the second-layer hash function; and a hash bucket assigner configured for assigning at least one of the plurality of second buckets to a node in the distributed system such that data items stored within one or more of the plurality of first buckets whose center points are mapped to the same second bucket are assigned to a same node in the distributed system so that the data items assigned to the same node represent similar data items.

9. The system of claim 8, wherein segmenting the plurality of center points to the one of the plurality of second buckets of the aggregated table based on the second-layer hash function comprises:

segmenting the plurality of center points to the one of the plurality of second buckets based on a respective position of each center point in the feature space, wherein the feature space is Euclidean space.

10. The system of claim 8, further comprising:

a direction based function determiner configured for determining one or more hash functions based on the one or more directions and their respective median points in the feature space, wherein each center point in the aggregated table is segmented into different partitions based on the one or more hash functions.

11. The system of claim 8, wherein the at least one of the plurality of second buckets is randomly assigned to the same node in the distributed system.

12. The system of claim 8, wherein each of the plurality of first-layer hash tables is a hash table generated based on a corresponding hash function, wherein the system further comprises:

a hash bucket computer configured for:

receiving input items each corresponding to one of the same set of keys; and computing, based on the corresponding hash function corresponding to each first-layer hash table of the plurality of first-layer hash tables, the same set of keys into the plurality of first buckets included in a corresponding first-layer hash table.

13. The system of claim 8, wherein assigning further comprises:

assigning one second bucket of the plurality of second buckets in the aggregated table to a first node in the distributed system, wherein assigning the one second bucket comprises:

determining at least one first bucket from at least one first-layer hash table having a corresponding center point mapped to the one second bucket, and sending data items from each of the at least one first bucket to the first node in the distributed system; and assigning a different second bucket of the plurality of second buckets in the aggregated table to a second node in the distributed system, wherein assigning the different second bucket comprises:

determining at least one different first bucket from at least one first-layer hash table having a corresponding center point mapped to the different second bucket, and sending data items from each of the different second bucket to the second node in the distributed system.

14. A machine-readable, non-transitory and tangible medium having information recorded thereon for data assignment in a distributed system, the information, when read by a machine, causes the machine to perform operations comprising:

obtaining a plurality of first-layer hash tables, each of which includes a plurality of first buckets, wherein each of the plurality of first-layer hash tables is generated based on a same set of keys and a different first-layer hash function;

determining a center point in a feature space for each first bucket included in each of the plurality of first-layer hash tables to obtain a plurality of center points;

generating an aggregated table that includes each center point of each first bucket included in the plurality of first-layer hash tables;

determining one or more directions in the feature space with maximum variance of each center point;

determining a median point in the feature space of a center point distribution along each of the one or more directions in the feature space;

mapping each center point to one of a plurality of second buckets of the aggregated table based on a second-layer hash function, the one or more directions, and the respective median points in the feature space, wherein center points corresponding to different first buckets that overlap in the feature space are mapped to a same second bucket in the aggregated table, wherein mapping each center point comprises segmenting the plurality of center points to the one of the plurality of second buckets of the aggregated table based on the second-layer hash function; and assigning at least one of the plurality of second buckets to a node in the distributed system such that data items stored within one or more of the plurality of first buckets whose center points are mapped to the same second bucket are assigned to a same node in the distributed system so that the data items assigned to the same node represent similar data items.

15. The medium of claim 14, wherein segmenting the plurality of center points to the one of the plurality of second buckets of the aggregated table based on the second-layer hash function comprises:

segmenting the plurality of center points to the one of the plurality of second buckets based on a respective position of each center point in the feature space, wherein the feature space is Euclidean space.

16. The medium of claim 14, wherein segmenting comprises:
determining one or more hash functions based on the one or more directions and their respective median points in the feature space, wherein each center point in the aggregated table is segmented into different partitions based on the one or more hash functions.

17. The medium of claim 14, wherein the at least one of the plurality of second buckets is randomly assigned to the same node in the distributed system.

18. The medium of claim 14, wherein each of the plurality of first-layer hash tables is a hash table generated based on a corresponding hash function, the operations further comprising:
receiving input items each corresponding to one of the same set of keys; and
computing, based on the corresponding hash function corresponding to each first-layer hash table of the plurality of first-layer hash tables, the same set of keys into the plurality of first buckets including in a corresponding first-layer hash table.

19. The medium of claim 14, wherein assigning further comprises:
assigning one second bucket of the plurality of second buckets in the aggregated table to a first node in the distributed system, wherein assigning the one second bucket comprises:
determining at least one first bucket from at least one first-layer hash table having a corresponding center point mapped to the one second bucket, and
sending data items from each of the at least one first bucket to the first node in the distributed system; and
assigning a different second bucket of the plurality of second buckets in the aggregated table to a second node in the distributed system, wherein assigning the different second bucket comprises:
determining at least one different first bucket from at least one first-layer hash table having a corresponding center point mapped to the different second bucket, and
sending data items from each of the different second bucket to the second node in the distributed system.

* * * * *